July 23, 1957  L. A. DE ROSA  2,800,654
RADIO LOCATION SYSTEM
Filed Dec. 21, 1954  4 Sheets-Sheet 1
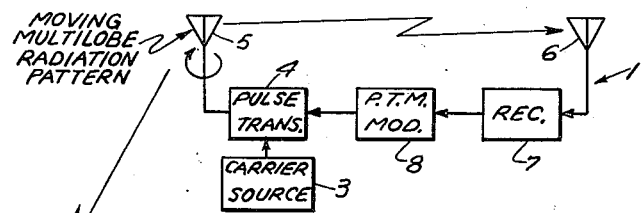
Fig. 1
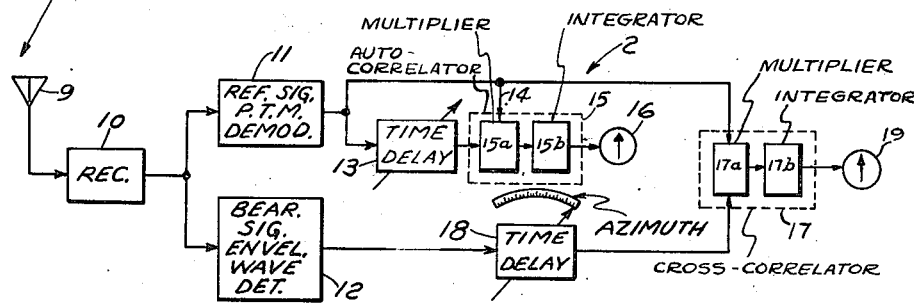
Fig. 4B
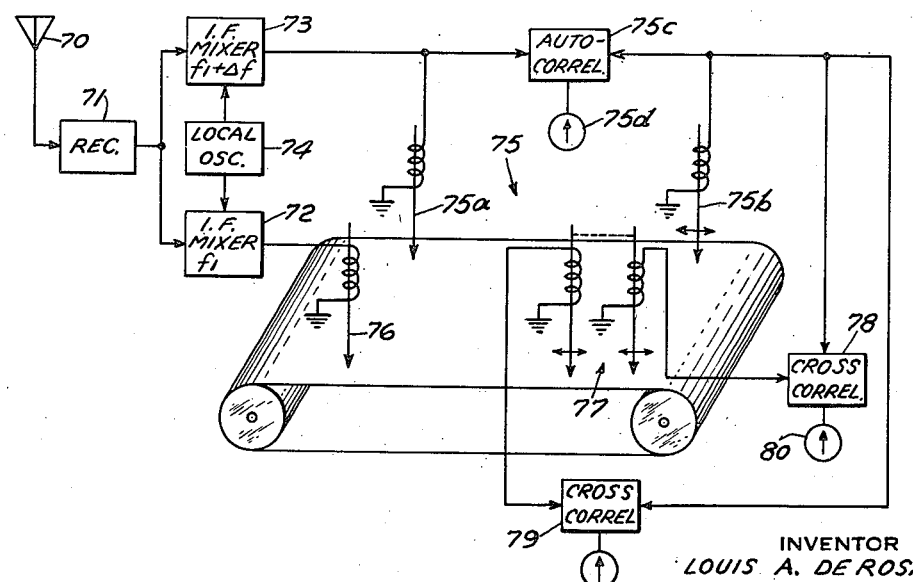
INVENTOR
LOUIS A. DE ROSA
BY Ernest Fanwick
ATTORNEY

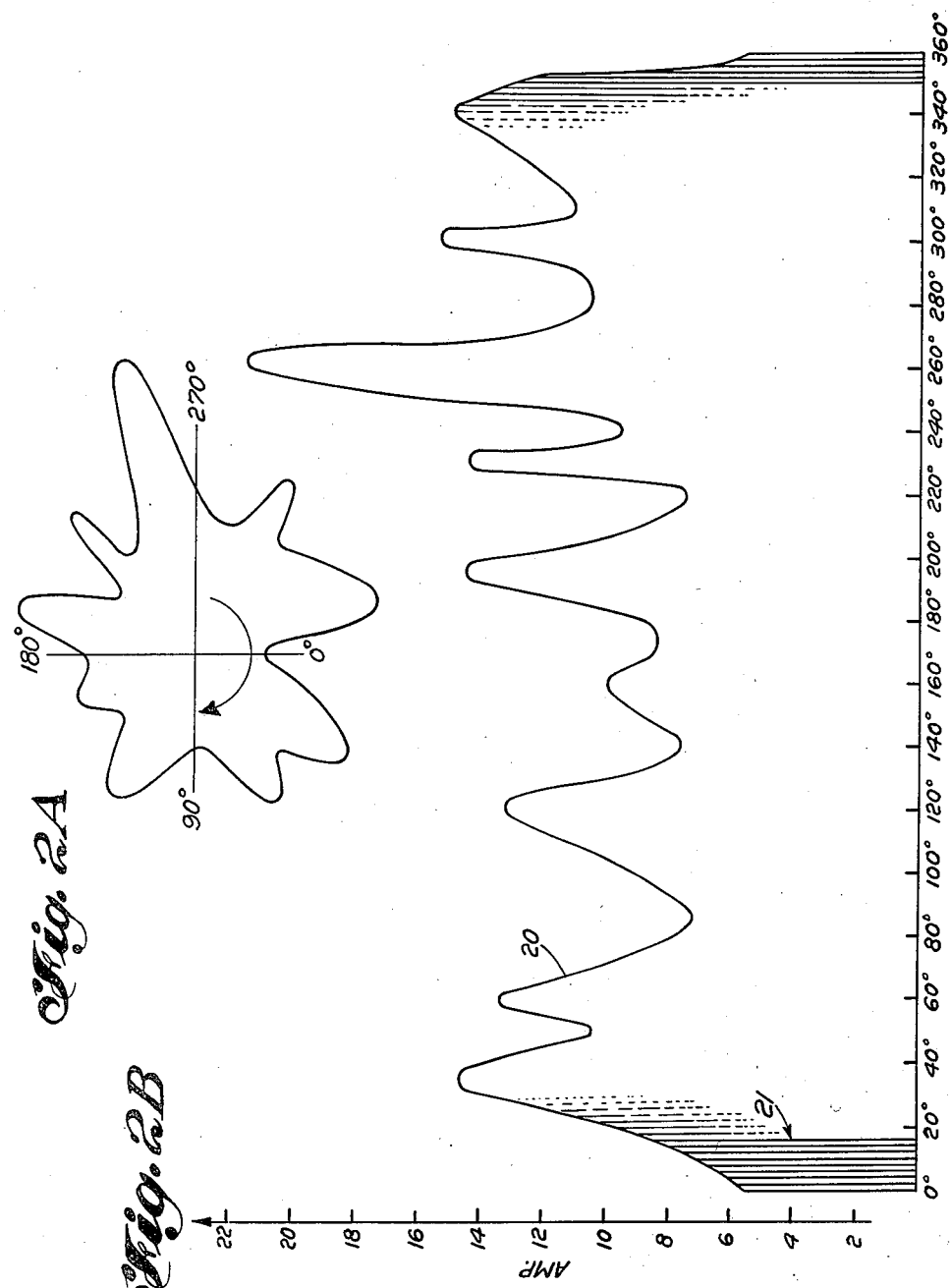

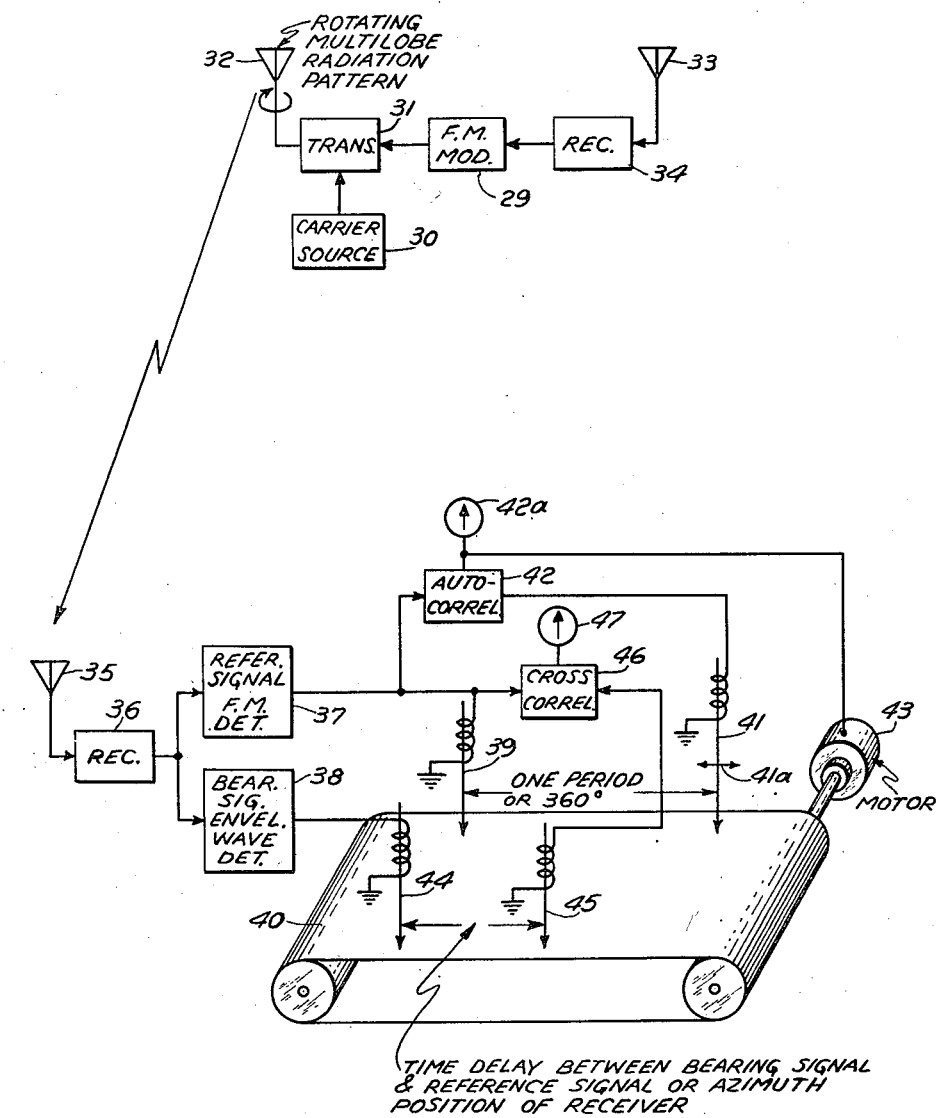

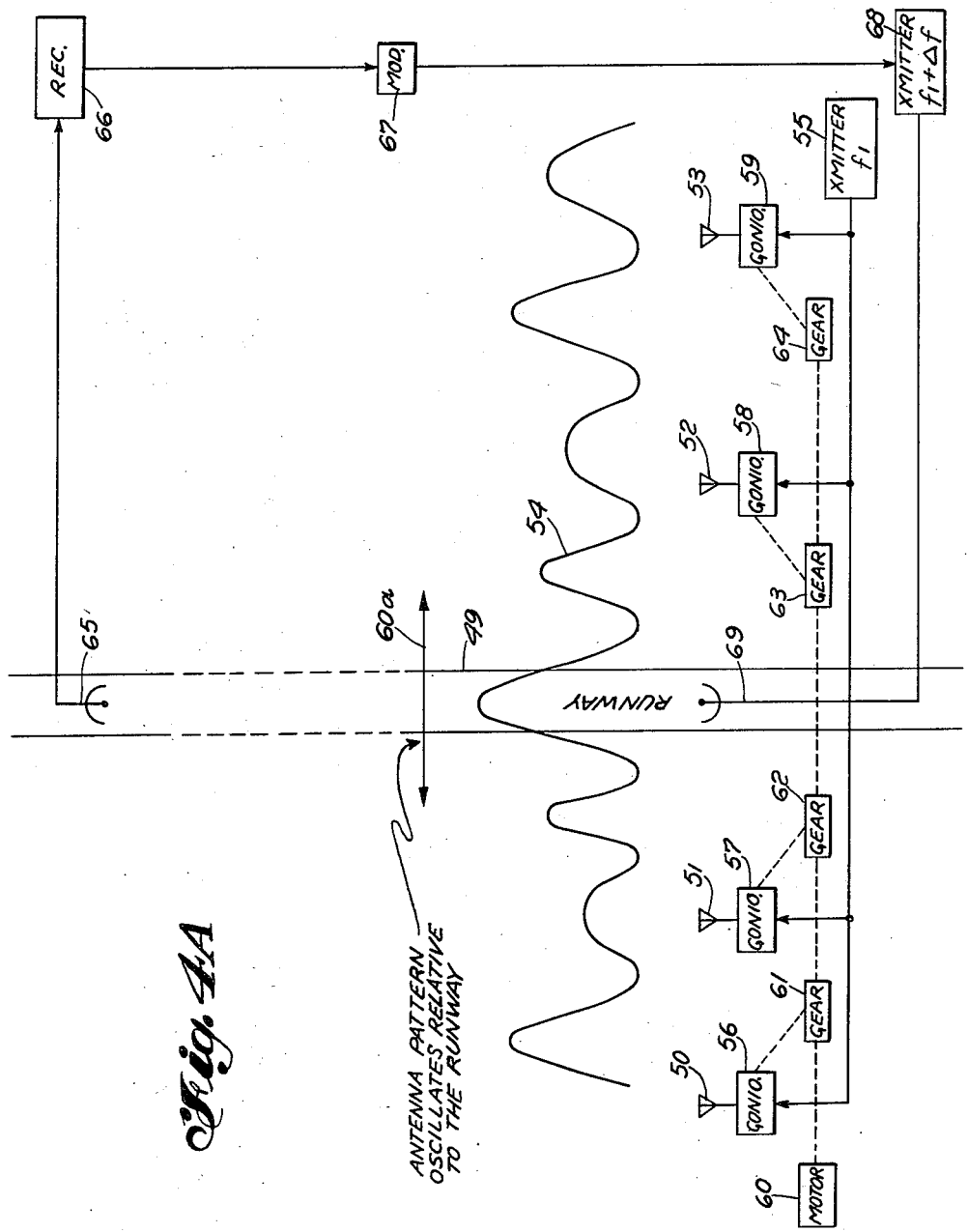

United States Patent Office 2,800,654
Patented July 23, 1957

2,800,654

RADIO LOCATION SYSTEM

Louis A. De Rosa, Bloomfield, N. J., assignor to International Telephone and Telegraph Corporation, Nutley, N. J., a corporation of Maryland Application December 21, 1954, Serial No. 476,797

19 Claims. (Cl. 343—106)

This invention relates to radio location systems and more particularly to improved radio omnirange and localizer systems utilizing correlation techniques.

Present radio location systems, such as radio omnirange or instrument landing systems, are considerably troubled by errors due to reflection of the transmitted signal, particularly where no attempt is made to correct or compensate for these errors. Bearing indications of omnirange systems can be in error by 20° or more due to these reflections. The use of the harmonic content of a transmitted signal has been found to reduce such errors. One type of known omnirange beacon system emits an asymmetrical rotating radiation pattern modulated by a reference pulse. The mobile receiver detects the reference pulse and synchronizes a reference signal generator which locally produces a signal wave having the same wave shape and form as the asymmetrical radiation pattern of the bearing signal and thus has the same fundamental and harmonic energy content. The received envelope wave and the locally generated signal are then compared and the indication of azimuth is obtained. In some known systems the bearing signal is directly compared with the reference signal pulse. However, such known systems require that the receiver have a prior knowledge of the wave shape and form of the transmitted signal so that it may be reproduced locally or that the rotational rate of the bearing signal be known or that the receiver have some knowledge of other characteristics. Advance knowledge of information places limitations upon the airborne equipment and severely restricts the usefulness of such systems to receivers which are capable of locally reproducing or simulating the rotating radiation patterns or having other advance information of the beacon systems.

It is recognized that if the transmitter of a radio location system emits an asymmetrical radiation pattern there are a plurality of parameters which may be utilized for improving the accuracy of the system indications. These parameters comprise in addition to the harmonic content of the received signal, the relative amplitude of the harmonic components and the relative phase of all these components. Known radio location systems have usually utilized only one parameter, the harmonic content. According to the present invention two signal waveforms are correlated in a manner to utilize all the above-mentioned parameters. The application of the correlation of the two signal waveforms to radio location systems increases the accuracy of these systems and simultaneously eliminates the errors due to reflection of the transmitted signal.

One of the principal objects of this invention, therefore, is to provide a radio location system which utilizes a multilobed radiation pattern moving past a point to produce an undulating signal according to the radiation pattern detected at such point, and transmitting a reference signal having the same shape as the undulating signal whereby a receiver may determine its position relative to the source of such signal radiations through the correlation of the undulating signal detected at the receiver and the received reference signal.

Another object of this invention is to provide a radio location signalling system for use with a mobile receiver having no prior knowledge of the radiated pattern of the signalling beacon.

A further object of this invention is to provide a radio omnirange system having a beacon radiating a rotating multilobed pattern and a reference signal waveform having the same shape as said pattern whereby a mobile receiver at a remote point through the correlation of the detected rotating radiation pattern and the omnidirectional reference signal produces an indication of the receiver's azimuth to said beacon.

Still a further object of this invention is to provide a radio location system for defining a given path line or direction in which a beacon transmits a multilobed oscillating radiation pattern on which is modulated a reference signal detected by a monitor receiver located on the desired path and whereby a receiver at a remote location can detect its position relative to the path by the correlation of the oscillating signal and the reference modulation.

One feature of this invention utilizes a transmitter which emits a carrier wave in the form of a moving multilobed radiation pattern. Monitor equipment associated with the transmitter perceives an undulating signal having a fundamental frequency equal to the movement of the radiation pattern and a harmonic frequency content equal to the product of the movement of lobes in the multilobe pattern times the movement of the radiation pattern, and this monitored signal is used as a reference signal to modulate the carrier wave. The transmitted signal received by a mobile receiver thus includes both the undulating signal of the moving radiation pattern and and the reference signal. Each of these signals is detected and correlated. In order to attain additional information at the mobile receiver from the beacon transmissions, the reference signal can be auto-correlated and then the bearing and reference signal cross-correlated. The output of the cross-correlation device produces an indication of the azimuth of the mobile receiver relative to the azimuth of the monitor location relative to the transmitting beacon.

The above-mentioned and other features and objects of this invention will become more apparent by reference to the following description taken in conjunction with the accompanying drawings, in which:

Fig. 1 is a schematic illustration in block form of one embodiment of a radio location system in accordance with the principles of this invention;

Figs. 2A and 2B are graphic illustrations of an antenna radiation pattern suitable for use with the radio location system of this invention;

Fig. 3 is an alternate embodiment of a radio location system suitable for use as an omnirange beacon in accordance with the principles of this invention; and Figs. 4A and 4B are schematic illustrations in block form of the transmitting and receiving portion of a localizer system for use in the instrument landing of aircraft in accordance with the principles of this invention.

Referring to Fig. 1 of the drawing, a schematic illustration in block form of one embodiment of a radio location system in accordance with the principles of this invention is shown to comprise a beacon system 1 and receiver equipment 2. The beacon system 1 includes a source of carrier frequency energy 3 coupled to a pulse modulating transmitter 4 which feeds an antenna system 5 with its pulse modulated output. The antenna system 5 is caused by well-known means to radiate a multilobed amplitude modulated radiation pattern such as is shown in Fig. 2A which is caused to move or rotate at a fundamental frequency equal to the rotation or movement rate and having a harmonic frequency content equal to the movement or rotational rate times the number of lobes in the multilobe pattern. A monitor antenna 6 located at a distance from the beacon transmitting antenna 5 perceives the undulating signal caused by the moving multilobed radiation pattern and couples the energy to a receiver 7 for detection of the envelope wave of the pulsed emissions of antenna 5. The envelope wave such as Fig. 2B, curve 20 is detected by receiver 7 and coupled through a pulse time modulation modulator 8 to vary the time spacing between pulses coupled by transmitter 4 to antenna system 5. The modulation of the rotating or bearing signal with the omnidirectional or reference pulse time modulated signal may be accomplished by other methods of modulations, such as frequency modulation as hereinafter described. In the system shown in Fig. 1 however the antenna system 5 is caused to emit a pulse modulated complex signal comprising a radio frequency (R. F.) pulse modulated carrier amplitude modulated by the multilobed antenna pattern of antenna system 5 and having its pulses time modulated with a reference signal having the same wave shape as the bearing signal detected at the location of monitor antenna 6.

This complex transmission is coupled by the mobile antenna 9 to a receiver 10 whose output is fed to a reference signal demodulator 11 and a bearing signal detector 12. The reference signal pulse time modulation demodulator output is coupled through a time delay circuit 13 and also directly via line 14 to an auto-correlator circuit 15. As described in the literature (for example, see Bell System Technical Journal, vol. 32, 1953, pp. 1174–1176, and particularly Fig. 3 on p. 1176), this consists of a multiplier 15a to which said delayed and undelayed outputs from the demodulator are applied, the multiplier output in turn being integrated in an integrator 15b. In accordance with well-known auto-correlation principles (see above-mentioned article) the time delay of circuit 13 is adjusted to be exactly equal to the time of one cycle or period as indicated by the output from the auto-correlator circuit 15 as shown by meter 16 being at a maximum and thus the period of the radiation pattern movement can be determined by the setting of the time delay circuit 13. The reference signal output of demodulator 11 is coupled to a cross-correlator circuit 17 consisting of a multiplier 17a and an integrator 17b and the bearing signal envelope wave output of detector 12 is coupled through time delay circuit 18 to the multiplier 17a of the cross-correlator circuit 17 (see article referred to hereinabove). The time delay circuit 18 is adjusted until maximum output, as read on meter 19, for the output of the cross-correlator circuit 17. The time delay adjustment of circuit 18 relative to the 360° timing of the period indicated by delay circuit 13 yields an indication of the azimuth of the mobile receiver equipment 2 relative to the beacon equipment 1.

Referring to Fig. 2A of the drawing, a polar plot of a multilobe antenna radiation suitable for use in accordance with the principles of this invention is shown. Persons skilled in the art will recognize that there are many well-known ways, both electronic and mechanical, for achieving such a multilobe radiation. Fig. 2B, curve 20 represents the envelope wave of the pulse modulated transmissions of beacon 1 of Fig. 1. The timing between the pulses indicated at 21 is modulated to achieve the omnidirectional radiation of the undulating waveform 20 as it appears at a reference direction such as north where the monitor antenna 6 is situated.

Referring to Fig. 3, an embodiment of the radio location system of this invention particularly suitable as an omnirange beacon system is shown wherein frequency modulation of the multilobe radiation pattern is utilized to achieve the non-directional radiation of the reference signal. A carrier frequency source 30 couples energy to a transmitter 31 whose output is radiated as a rotating multilobe radiation pattern by antenna 32. A monitor antenna 33, situated in a reference direction such as north, couples energy to a receiver 34 where the undulating waveform due to the rotation of the multilobe energy radiated by the antenna system 32 is detected and coupled to an FM (frequency modulation) modulator 29 whose output frequency modulates the output of transmitter 31. The complex wave comprising the amplitude modulated envelope wave and the frequency modulated reference wave radiated by antenna 32 is received at the mobile location by antenna 35 and coupled to receiver 36. The output of the receiver 36 is coupled to the reference signal or frequency modulation detector 37 and to the bearing signal or amplitude modulated envelope detector 38. The output of the frequency modulation detector 37 comprising the reference signal is recorded by means of recording head 39 onto a moving magnetic recording medium 40. A pickup head 41 detects the waveform recorded on medium 40 by recording device 39 and couples the detected output to an auto-correlation circuit 42 (similar to 15 of Fig. 1) which has as its other input the reference signal output of detector 37. As pickup head 41 is moved to and fro as indicated by arrow 41a the period of the recorded waveform is determined since a maximum output from the auto-correlation circuit 42 indicates a separation between magnetic heads 39 and 41 exactly equal to one period or 360° at the rotational speed of the belt 40. The motor drive 43 for the magnetic medium 40 is responsive to the maximum output from the auto-correlator 42 to maintain the magnetic medium movement speed in synchronism with the movement speed of the radiation pattern or the reference signal period and thus slight changes in the movement rate will be compensated for by variations in the speed of the magnetic medium movement rate. The bearing signal output of detector 38 is coupled to a second recording head 44 which records the bearing signal on a second recording track to be picked up by magnetic pickup head 45 which couples the bearing signal to the cross-correlator circuit 46 (similar to 17 of Fig. 1) along with the reference signal. The reference signal magnetic pickup head 41 is moved along the recording track to vary the time delay between recording and pickup. The distance between heads 39 and 41 represents 360° of azimuth. The distance between recording head 44 and pickup head 45 compared to the distance between recording head 39 and pickup head 41 representing 360° is the relative azimuth of the mobile radio receiver compared to the transmitter and is indicated by a maximum output from meter 47. If the repetition rate or movement rate of the radiation pattern transmitted by the beacon is known in advance the motor control circuit can be eliminated and other means well known to those skilled in the art can be substituted for synchronizing the movement of the recording medium.

Referring to Figs. 4A and 4B of the drawing, the localizer beacon portion of an instrument landing system in accordance with the principles of this invention is shown comprising an instrument landing transmitting portion Fig. 4A and a mobile receiving portion Fig. 4B. The localizer portion 4A comprises an antenna array spaced perpendicular to the desired localizer path or runway 49 alignment such as are represented by antennas 50, 51, 52 and 53. The radiation pattern emitted by the antenna system comprises a multilobe pattern schematically illustrated by curve 54. Carrier frequency energy at a frequency $f_1$ is coupled from transmitter 55 through a goniometer 56, 57, 58 and 59, associated with each of the antennas 50, 51, 52 and 53 of the antenna system. A motor 60 moves each of the goniometers 56–59 through gears 61–64. The synchronous movement of the goniometers 56–59 causes the antenna pattern 54 to move back and forth across the runway as indicated by arrow 60a. The undulating signal due to the movement of the antenna pattern 54 is detected by a monitor antenna 65 located at the center line of the desired localizer path which is coupled to a receiver 66. The output of receiver 66 is coupled to a modulator 67 which modulates a transmitter operating at a frequency $f_1$ plus $\Delta f$ transmitter 68. The output of transmitter 68 is coupled to antenna 69 which radiates the undulating signal detected by receiver 65 in a direction along the desired localizer path. It should appear obvious that a mobile receiver which detects a signal identical to the signal detected by antenna 65 will be along the desired localizer path, whereas any variation in the two signals will indicate a deviation from the desired path and thus the mobile receiver need only detect the undulating signal 54 and compare it with the signal from antenna 69. Fig. 4B illustrates schematically in block form one embodiment of the receiver for use with the transmitting portion of the instrument landing system shown in Fig. 4A. The antenna 70 couples energy to receiver 71 whose output is coupled to a plurality of intermediate-frequency (I. F.) filter stages 72 and 73. A local oscillator 74 has its output coupled to the I. F. mixer and filters 72 and 73. The output of mixer and filter 72 comprises the signals received by carrier at frequency $f_1$, whereas the output of filter and mixer 73 comprises the signals transmitted on carrier $f_1 + \Delta f$. Obviously, the receiver 71 must be wideband enough to receive both adjacent carrier frequencies. The signals on carrier $f_1 + \Delta f$ passed by filter and mixer 73 are coupled to magnetic recording device generally indicated at 75 and function in the same manner as the device described in connection with Fig. 3 to obtain the period of the signal as a function of the distance between magnetic pickup and recording heads 75a and 75b respectively. The localizer signal recorded on the magnetic medium by recording head 76 is picked up by dual recording head 77. The outputs from the dual recording heads 77 are separately correlated with the bearing reference signal in cross-correlators 78 and 79 (both similar to 17 of Fig. 1) and meters 80 and 81 read equally when the dual recording head 77 exactly straddles the position of maximum correlation. In any other position, an indication of which direction the dual recording head 77 should be moved in order to achieve maximum correlation will be obtained from the readings on meters 80 and 81, thus increasing the speed of obtaining the correlation function. If even greater speed is desired, a plurality of non-movable pickup heads can be located between recording head 76 and the end of the magnetic medium and the pickup from each head separately correlated with the reference signal and the head indicating the maximum correlation will be an indication of the deviation from the desired course line. The accuracy of such a multi-head correlation device is of course proportional to the number of heads.

While I have described above the principles of my invention in connection with specific apparatus, it is to be clearly understood that this description is made only by way of example and not as a limitation to the scope of my invention as set forth in the objects thereof and in the accompanying claims.

I claim:

1. A radio location system comprising a source of radiations including means for radiating a moving multilobe pattern to present at a remote point a given undulating signal, a monitor receiver located at a distance and in a given direction from said source for detecting said undulating signal, means for transmitting as a reference signal the undulating signal detected by said monitor receiver in time relation with the movement of said pattern, a receiver at a remote location for detecting the undulating signal of said movable multilobe pattern and said reference signal and means for comparing the received undulating signal and the reference signal to produce an indication of the azimuth of said source from said location.

2. A radio system for defining a given path line comprising a source of radiations including means to produce a bearing signal having a multilobed radiation pattern oscillating relative to said path, a monitor receiver located on said path at a distance from said source for detecting said radiations, means for transmitting as a reference signal the signals detected by said monitor receiver, a receiver at a remote location for detecting said bearing signal and said reference signal and means for comparing said bearing and reference signals to produce an indication of the position of said path relative to said remote location.

3. A radio omnirange system comprising a beacon including means for radiating a rotating multilobe pattern, a monitor receiver located at a distance and in a given direction from said beacon for detecting said radiation, means for transmitting said monitored radiation omnidirectionally, a receiver at a remote point for detecting said rotating multilobe and said omnidirectional patterns, means for comparing said detected multilobe pattern with said detected omnidirectional pattern to produce an indication of the azimuth from said remote point to said beacon.

4. A radio location system comprising a source of radiations including means for radiating carrier frequency energy as a moving multilobed pattern causing an amplitude modulated signal to be received at a given point, a monitor receiver located at a distance and in a given direction from said source for detecting said amplitude modulated signal, means for transmitting said detected signal as a frequency modulation of said carrier, a receiver at a remote location for detecting said amplitude and said frequency modulated signals and means for comparing the received signals with each other to produce an indication of the azimuth of said source from said remote location.

5. A radio location system comprising a source of radiations including means for radiating pulse modulated carrier frequency energy as a multilobed pattern moving past a point to cause the envelope of said pulse modulated energy detected at said point to be amplitude modulated according to said pattern, a monitor receiver located in a given direction and at a distance from said source for detecting said amplitude modulated signal, means for time modulating said pulse modulated signal in accordance with said amplitude modulations, a receiver at a remote location for detecting said amplitude modulations and said pulse time modulations and means for comparing with each other the signals derived from said modulations to produce an indication of the azimuth of said source from said remote location.

6. A radio location system comprising a source of radiations including means for radiating carrier energy at a first frequency as a multilobed pattern moving past a point to present at said point an amplitude modulated signal, a monitor receiver located in a given direction and at a distance from said source for detecting said amplitude modulated signal, a source of carrier energy at a second frequency, means to modulate said second carrier frequency with said detected signal, means to transmit omnidirectionally said modulated second carrier frequency, receiver means at a remote location for detecting the signal modulations of said first and second carrier frequency energies and means for comparing the detected signals with each other to produce an indication of the azimuth of said source from said remote location.

7. A radio location system comprising a source of radiations including means for radiating a multilobed pattern moving past a point to present thereat an undulating signal, a monitor receiver located at a distance from said source for detecting said undulating signal, means for transmitting as a reference signal said monitored undulating signal in time relation with the movement of said pattern, a receiver at a remote location for detecting said undulating signal and said reference signal, means for correlating said detected undulating signal and said reference signal, and time delay means for varying the time of one of said signals relative to the other to obtain the maximum output from said correlation means whereby said variation in time is indicative of the azimuth of said source from said remote location.

8. A radio location system comprising a source of radiations including means for radiating a multilobed pattern moving past a point to present thereat an undulating signal, a monitor receiver located at a distance from said source for detecting said undulating signal, means for transmitting as a reference signal said monitored undulating signal in time relation with the movement of said pattern, a receiver at a remote location for detecting said undulating signal and said reference signal, auto-correlation means to determine the period of said undulation, cross-correlation means including variable time delay means for determining the time difference between said detected signals whereby said time difference relative to said period produces an indication of the azimuth of said source from said remote location.

9. A radio location system comprising a source of radiations including means for radiating a multilobed pattern moving past a point to present thereat an undulating signal, a monitor receiver located at a distance from said source for detecting said undulating signal, means for transmitting as a reference signal said monitored undulating signal in time relation with the movement of said pattern, a receiver at a remote location for detecting said undulating signal and said reference signal, means for recording said undulating signal including a moving recording medium and a first recording device, means for recording said undulating signal including a moving recording meduim and a first recording device, means for recording said reference signal, means for detecting said recorded reference signal, said detecting means being variable with respect to said reference signal recording means, means for correlating said recorded reference signal and said detected reference signal to determine the period of said undulation relative to the transmisison of said reference signal, means to vary the speed of movement of said recording medium relative said recording device responsive to the output of said auto-correlation means to cause said undulating signal to be repetitively recorded on said medium, means for detecting said repetitively recorded undulating signal, and means for correlating said detected undulating signal and said reference signal to produce an indication of the azimuth of said source from said remote location.

10. A radio location system comprising a source of radiations including means for radiating a multilobed pattern moving past a point to present thereat an undulating signal, a monitor receiver located at a distance from said source for detecting said undulating signal, means for transmitting as a reference signal said monitored undulating signal in time relation with the movement of said pattern, a receiver at a remote location for detecting said undulating signal and said reference signal, means for recording said undulating signal including a moving recording medium and a first recording device, means for recording said reference signal, first means for detecting said recorded reference signal, second means for detecting said recorded signal movable with respect to said first means, means for correlating the output of said first and second detecting means, means to move said second detecting means to produce a maximum output from said correlation means thereby producing an indication of the period of said reference signal proportional to the spacing between said first and second detecting means, means for detecting said undulating signal movable with respect to said undulating signal recording means, means to correlate said detected recorded undulating signal and said detected recorded reference signal, means to move said undulating signal detector means to obtain a maximum output from said last mentioned correlation means to produce an indication of the azimuth of said source from said remote location.

11. A radio location system comprising a source of radiations including means for radiating a multilobed pattern moving past a point to present thereat an undulating signal, a monitor receiver located at a distance from said source for detecting said undulating signal, means for transmitting as a reference signal said monitored undulating signal in time relation with the movement of said pattern, a receiver at a remote location for detecting said undulating signal and said reference signal, means for recording said undulating signal including a recording medium and a first recording device, means for recording said reference signal, plurality of means spaced adjacent to each other for detecting said reference signal, means for correlating the output of each of said plurality of detecting means with said detected reference signal to determine the period of said undulation relative to the transmission of said reference signal, means to correlate said reference signal and said recorded undulating signal to produce an indication of the azimuth of said source from said remote location.

12. A radio location system comprising a source of radiations including means for radiating a multilobed pattern moving past a point to present thereat an undulating signal, a monitor receiver located at a distance from said source for detecting said undulating signal, means for transmitting as a reference signal said monitored undulating signal in time relation with the movement of said pattern, a receiver at a remote location for detecting said undulating signal and said reference signal, means for recording said undulating signal including a recording medium and a first recording device, means for recording said reference signal, first means for detecting said recorded reference signal, dual means for detecting said recorded signal movable with respect to said first means, means for correlating the output of said first detecting means and the output of each of said dual detecting means, means to move said dual detecting means to cause the output of each of said correlation means to be equal and thereby producing an indication of the period of said reference signal proportional to the spacing between said first and dual detecting means, means for detecting said undulating signal movable with respect to said undulating signal recording means, means to correlate said detected recorded undulating signal and said detected recorded reference signal, means to move said undulating signal detector means to obtain a maximum output from said last mentioned correlation means to produce an indication of the azimuth of said source from said remote location.

13. A radio location system comprising a source of radiations including means for radiating carrier energy at a first frequency as a multilobed pattern moving past a point to present thereat an amplitude modulated signal, a monitor receiver located at a distance from said source for detecting said amplitude modulated signal, a source of carrier energy at a second frequency means to modulate said second carrier frequency with said detected signal, means to transmit omnidirectionally said modulated second carrier frequency, a receiver at a remote location for detecting the signal modulations of said first and second carrier frequency energies, a local oscillator, means to mix the output of said local oscillator with said received first and second carrier frequencies to produce a first and second intermediate frequency variable time delay means, means to couple one of said intermediate frequencies to said time delay means, means for correlating said delayed intermediate frequency and the undelayed intermediate frequency, means to vary said time delay to obtain maximum output from said correlation means whereby said variation in time is indicative of the azimuth of said source from said remote location.

14. A radio beacon comprising a source of radiations including means for radiating a moving multilobe pattern to present at a remote point a given undulating signal, a monitor receiver located at a distance and in a given direction from said source for detecting said undulating signal, and means for transmitting as a reference signal the undulating signal detected by said monitor receiver in time relation with the movement of said pattern.

15. A radio beacon comprising a source of radio frequency energy, antenna means coupled to said source for radiating a multilobed pattern moving past a point to present thereat an undulating signal, a monitor receiver located at a distance from said antenna means for detecting said undulating signal, and means for transmitting as a reference signal said monitored undulating signal in time relation with the movement of said pattern.

16. A radio receiver to cooperate with a radio beacon adapted to radiate a revolving multilobed pattern so as to present at a remote point an undulating signal and to transmit as a reference signal said undulating signal in time relation with the movement of said pattern; said receiver comprising means for detecting said undulating signal and said reference signal, means for correlating said detected undulating signal and said reference signal, and time delay means for varying the time of one of said detected signals relative to the other to obtain the maximum output from said correlation means whereby said variation in time is indicative of the azimuth of said source from said remote location.

17. A radio receiver to cooperate with a radio beacon adapted to radiate a revolving multilobed pattern so as to present at a remote point an undulating signal and to transmit as a reference signal said undulating signal in time relation with the movement of said pattern; said receiver comprising means for detecting said undulating signal and said reference signal, auto-correlation means to determine the period of said undulation, an cross-correlation means including variable time delay means for determining the time difference between said detected signals whereby said time difference relative to said period produces an indication of the azimuth of said receiver to said beacon.

18. A radio receiver to cooperate with a radio beacon adapted to radiate a revolving multilobed pattern so as to present at a remote point an undulating signal and to transmit as a reference signal said undulating signal in time relation with the movement of said pattern; said receiver comprising means for detecting said undulating signal and said reference signal, means for recording said undulating signal including a moving recording medium and a first recording device, means for recording said reference signal, means for detecting said recorded reference signal, said detecting means being variable with respect to said reference signal recording means, first means for correlating said recorded reference signal and said detected reference signal to determine the period of said undulation relative to the transmission of said reference signal, means to vary the speed of movement of said recording medium relative said recording device responsive to the output of said correlation means to cause said undulating signal to be repetitively recorded on said medium, means for detecting said repetitively recorded undulating signal, and second means for correlating said detected undulating signal and said reference signal to produce an indication of the azimuth of said source from said remote location.

19. A radio receiver to cooperate with a radio beacon adapted to radiate a revolving multilobed pattern so as to present at a remote point an undulating signal and to transmit as a reference signal said undulating signal in time relation with the movement of said pattern; said receiver comprising means for detecting said undulating signal and said reference signal, means for recording said undulating signal including a moving recording medium and a first recording device, means for recording said reference signal, first means for detecting said recorded reference signal, second means for detecting said recorded signal movable with respect to said first means, means for correlating the output of said first and second detecting means, means to move said second detecting means to produce a maximum output from said correlation means thereby producing an indication of the period of said reference signal proportional to the spacing between said first and second detecting means, means for detecting said undulating signal movable with respect to said undulating signal recording means, means to correlate said detected recorded undulating signal and said detected recorded reference signal, means to move said undulating signal detector means to obtain a maximum output from said last mentioned correlation means to produce an indication of the azimuth of said source from said remote location.

References Cited in the file of this patent

UNITED STATES PATENTS

| 1,815,246 | Englund | July 21, 1931 |
| 2,609,534 | Taylor | Sept. 2, 1952 |